Patented Feb. 7, 1933                                                          1,896,535

UNITED STATES PATENT OFFICE

OSWALD BEHREND, OF NITRO, WEST VIRGINIA, ASSIGNOR TO THE RUBBER SERVICE LABORATORIES COMPANY, OF AKRON, OHIO, A CORPORATION OF OHIO

VULCANIZATION OF RUBBER

No Drawing.    Application filed February 18, 1930. Serial No. 429,461.

The present invention relates to the vulcanization of rubber or similar materials such as gutta percha, balata and the like. More particularly, the present invention is directed to the vulcanization of natural rubber wherein a new class of materials as hereinafter set forth are employed as accelerators of the vulcanization process.

As is well known, many valuable accelerators of the rubber vulcanization process comprise reaction products of aldehydes with amines. According to the present invention, it has been found that on further reacting an aldehyde amine accelerating reaction product with a halogenated aromatic hydrocarbon, a new class of materials possessing very desirable accelerating qualities is obtained.

More particularly, the present invention reates to the use of a class of rubber vulcanization accelerators, comprising a product formed by treating an accelerating reaction product of an aliphatic aldehyde and an aromatic primary amine with a methyl substituted aromatic hydrocarbon, wherein one or more hydrogen atoms of said methyl group are substituted with a halogen and particularly with chlorine.

One method whereby one of the preferred class of accelerating compounds, for example, a reaction product of benzyl chloride and heptaldehyde-aniline was prepared, is as follows.

Substantially one molecular proportion of heptaldehyde aniline was placed in a reactor and substantially one molecular proportion of benzyl chloride added slowly thereto at a temperature of substantially 130 to 145° C. After the benzyl chloride was added to the heptaldehyde aniline, heating of the reaction product was continued for approximately one hour at a temperature of substantially 130 to 145° C., after which any unreacted matter present was removed therefrom, preferably by steam distillation. The residue remaining after washing with water, and comprising an oil, was dried and incorporated in a rubber mix in the usual manner. A mix comprising 100  parts of pale crepe rubber
      5  parts of zinc oxide
    3.5  parts of sulfur
    0.8  part of accelerator was prepared and vulcanization effected by heating in a press for different periods of time and at different steam pressures. On testing the vulcanized rubber product thus obtained, the physical characteristics given in Table I were obtained.

Table I

| Cure time mins. | Lbs. steam pressure per sq. in. | Modulus of elasticity in lbs/in² at elongations of | | | Tensile at break in lbs/in² | Ultimate elongation % |
|---|---|---|---|---|---|---|
| | | 300% | 500% | 700% | | |
| 60 | 20 | 107 | 264 | 948 | 2870 | 920 |
| 10 | 40 | 55 | 160 | 498 | 1280 | 880 |
| 20 | 40 | 112 | 317 | 1185 | 2990 | 870 |
| 30 | 40 | 163 | 488 | 1950 | 3890 | 840 |
| 60 | 40 | 225 | 711 | 2725 | 4230 | 785 |

From the data set forth in Table I, it is apparent that the benzyl chloride reaction product of heptaldehyde aniline employed is a very desirable vulcanization accelerator and produces a cured rubber of high quality. Of exceptional merit is its delayed action; that is, the stock containing the preferred accelerator does not tend to cure or set up on the mill rolls during the milling and handling of the rubber stock.

Another of the preferred class of vulcanization accelerators, for example the reaction product of heptaldehyde aniline and benzotrichloride was prepared by adding substantially three molecular proportions of heptaldehyde aniline to substantially one molecular proportion of benzotrichloride in a vessel equipped with a reflux condenser and maintained at a temperature of substantially 100 to 120° C., care being taken to keep the vigorous reaction, which takes place, under control by the use of suitable cooling means. The product thus formed was treated by the addition thereto of an alcoholic solution of a suitable alkali such as sodium hydroxide, and the resulting material was filtered and the alcohol separated from the filtrate by distillation or the like. The residue comprising the desired reaction product of heptaldehyde aniline and benzotrichloride was incorporated in a rubber mix comprising 100    parts of pale crepe rubber
    5    parts of zinc oxide
    3.5  parts of sulfur
    1.0  part of accelerator This compounded rubber stock was then vulcanized and the following results obtained on testing the cured rubber product.

Table II

| Cure | | Modulus of elasticity in lbs/in² at elongations of | | | Tensile at break in lbs/in² | Ultimate elongation % |
| --- | --- | --- | --- | --- | --- | --- |
| Time mins. | lbs. steam pressure | 300% | 500% | 700% | | |
| 15 | 40 | 192 | 508 | 1930 | 3710 | 830 |
| 30 | 40 | 258 | 873 | 3370 | 4090 | 740 |
| 45 | 40 | 281 | 1015 | 3820 | 4360 | 730 |
| 60 | 40 | 325 | 1075 | 3915 | 4450 | 730 |

The data as set forth in Table II show further that the reaction products of a halogenated aromatic hydrocarbon and an aldehyde-amine product constitutes a valuable class of rubber vulcanization accelerators.

The reaction products of substantially equi-molecular proportions of acetaldehyde-aniline and benzyl chloride, of butylaldehyde-aniline and benzyl chloride, of substantially two molecular proportions of butylaldehyde-aniline and substantially one molecular proportion of benzal chloride have been prepared and compounded in a rubber stock comprising 100 parts of pale crepe rubber, 5 parts of zinc oxide, 3.5 parts of sulfur and 1 part of accelerator and found after curing and testing of the vulcanized rubber product to possess accelerating qualities.

Other aldehyde-amines than those hereinbefore set forth may be reacted with a halogenated aromatic hydrocarbon and employed as accelerators in a rubber mix. Thus, formaldehyde-aniline, propionaldehyde-aniline, the aldehyde-toluidines, the aldehyde-xylidenes and the like may be reacted with benzyl chloride, benzal chloride, benzo-trichloride and analogous compounds and employed in the rubber vulcanization process.

The present invention is not limited to the specific examples hereinbefore set forth wherein the preferred accelerators are employed. Other ratios of the compounding ingredients than those hereinbefore set forth may be employed and are apparent to those skilled in the art to which this invention pertains. The invention is limited solely by the following claims wherein the invention is claimed as broadly as possible in view of the prior art.

What is claimed is:

1. The process of vulcanizing rubber which comprises heating rubber and sulfur in the presence of a vulcanization accelerator comprising a product formed by treating an aliphatic aldehyde aromatic amine reaction product with toluene containing at least one substituted halogen atom in the methyl group.

2. The process of vulcanizing rubber which comprises heating rubber and sulfur in the presence of a vulcanization accelerator comprising a product prepared by treating a reaction product of an aliphatic aldehyde containing less than eight carbon atoms and aniline with toluene containing at least one substituted halogen atom in the methyl group.

3. The process of vulcanizing rubber which comprises heating rubber and sulfur in the presence of a vulcanization accelerator comprising a product prepared by treating heptaldehyde aniline with toluene containing at least one substituted chlorine atom in the methyl group.

4. The process of vulcanizing rubber which comprises heating rubber and sulfur in the presence of a vulcanization accelerator comprising a product prepared by treating heptaldehyde aniline with benzo trichloride.

5. The process of vulcanizing rubber which comprises heating rubber and sulfur in the presence of a vulcanization accelerator comprising a reaction product of substantially three molecular proportions of heptaldehyde aniline and substantially one molecular proportion of benzo trichloride.

6. The vulcanized rubber product prepared by heating rubber and sulfur in the presence of a vulcanization accelerator comprising a product formed by treating an aliphatic aldehyde aromatic amine reaction product with toluene containing at least one substituted halogen atom in the methyl group.

7. The vulcanized rubber product prepared by heating rubber and sulfur in the presence of a vulcanization accelerator comprising a product formed by treating a reaction product of an aliphatic aldehyde containing less than eight carbon atoms and aniline with toluene containing at least one substituted halogen atom in the methyl group.

8. The vulcanized rubber product prepared by heating rubber and sulfur in the presence of a vulcanization accelerator comprising a product prepared by treating heptaldehyde aniline with toluene containing at least one substituted chlorine atom in the methyl group.

9. The vulcanized rubber product prepared by heating rubber and sulfur in the presence of a vulcanization accelerator comprising a product prepared by treating heptaldehyde aniline with benzo trichloride.

10. The vulcanized rubber product prepared by heating rubber and sulfur in the presence of a vulcanization accelerator comprising a reaction product of substantially three molecular proportions of heptaldehyde aniline and substantially one molecular proportion of benzo trichloride.

In testimony whereof I hereunto affix my signature.

OSWALD BEHREND.